US012626502B2

(12) United States Patent

Schimmel et al.

(10) Patent No.: US 12,626,502 B2
(45) Date of Patent: May 12, 2026

(54) AUTOMATICALLY MEASURING AN ITEM BASED ON A RATIO BETWEEN ITEM DIMENSIONS AND REFERENCE TAG DIMENSIONS

(71) Applicant: UNITED STATES POSTAL SERVICE, Washington, DC (US)

(72) Inventors: Todd M. Schimmel, Annandale, VA (US); Ryan J. Simpson, Vienna, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

(21) Appl. No.: 17/190,476

(22) Filed: Mar. 3, 2021

(65) Prior Publication Data

US 2021/0279501 A1    Sep. 9, 2021

Related U.S. Application Data

(60) Provisional application No. 62/985,011, filed on Mar. 4, 2020.

(51) Int. Cl.
*G06V 20/00*        (2022.01)
*G06K 19/06*        (2006.01)
(Continued)

(52) U.S. Cl.
CPC ....... *G06V 20/00* (2022.01); *G06K 19/06009* (2013.01); *G06K 19/0776* (2013.01); (Continued)

(58) Field of Classification Search
CPC .............. G06V 10/42; G06V 2201/09; G06V 30/2247; G06V 30/424; G06V 20/00; G06K 19/06009; G06K 19/0776; G06T 7/62
(Continued)

(56) References Cited

U.S. PATENT DOCUMENTS 10,438,100 B1 * 10/2019 O'Hagan ............. G06K 15/024
2002/0113365 A1 * 8/2002 Britton ...................... B07C 3/06
                                                            271/303
(Continued)

FOREIGN PATENT DOCUMENTS

EP          3702985 A1 * 9/2020 .......... G06Q 10/083
KR     20190140113 A * 12/2019 ............. A43D 95/00
WO   WO-2016057479 A1 * 4/2016 .......... G06K 9/6202

OTHER PUBLICATIONS

Extended European Search Report issued in European Patent Application No. 21160321.2 on Jul. 14, 2021, 7 pages.
(Continued)

*Primary Examiner* — Steven S Paik
*Assistant Examiner* — Tae W Kim
(74) *Attorney, Agent, or Firm* — MH2 Technology Law Group, LLP

(57) ABSTRACT

An item measuring system and its relate processes may perform operations that include receiving an image of an item and a reference tag; identifying a perimeter of the item; identifying a type of the reference tag; identifying known dimensions of the reference tag based on the type; determining dimensions of the item in standardized units based on the known dimensions of the reference tag; and outputting information identifying the dimensions of the item.

20 Claims, 4 Drawing Sheets

(51) Int. Cl.
| | |
|---|---|
| *G06K 19/077* | (2006.01) |
| *G06T 7/62* | (2017.01) |
| *G06V 30/224* | (2022.01) |
| *G06V 30/424* | (2022.01) |

(52) U.S. Cl.
CPC ............ *G06T 7/62* (2017.01); *G06V 30/2247* (2022.01); *G06V 30/424* (2022.01)

(58) Field of Classification Search
USPC ........................................................ 382/203
See application file for complete search history.

(56) References Cited

U.S. PATENT DOCUMENTS

| | | | |
|---|---|---|---|
| 2013/0024326 A1* | 1/2013 | Dearing ................... | B07C 3/18 |
| | | | 382/101 |
| 2015/0042791 A1 | 2/2015 | Metois et al. | |
| 2015/0199853 A1 | 7/2015 | Bentley et al. | |
| 2019/0220990 A1* | 7/2019 | Goja ...................... | G06Q 50/28 |

OTHER PUBLICATIONS

Communication pursuant to Article 94(3) EPC issued in European Patent Application No. 21160321.2 on Oct. 12, 2023, 5 pages.

\* cited by examiner

200

210  Receive image

220  Identify item perimeter

230  Detect reference tag

240  Extract reference tag features

250  Identify reference tag type and corresponding dimensions

260  Determine length represented by each pixel

270  Determine item dimensions in pixels

280  Convert item dimensions in pixels to standardized units

290  Output information regarding item dimensions

AUTOMATICALLY MEASURING AN ITEM BASED ON A RATIO BETWEEN ITEM DIMENSIONS AND REFERENCE TAG DIMENSIONS

CROSS-REFERENCE TO RELATED APPLICATIONS

This application claims the benefit of and priority to U.S. Provisional Patent Application No. 62/985,011 filed on Mar. 4, 2020, which is hereby incorporated by reference in its entirety.

BACKGROUND

Service providers, such as mail or package delivery service providers, may charge for services based on the size and/or dimensions of an item. Other service providers (e.g., airlines) may charge various rates based on the size/dimensions of an item (e.g., luggage). As such, a customer may need to accurately measure the item to avoid being overcharged for service, or undercharged, resulting in the customer not receiving the service.

SUMMARY

In one example aspect, a computer-implemented method performed by an item measuring system may include receiving an image of an item and a reference tag; identifying a perimeter of the item; identifying a type of the reference tag; identifying known dimensions of the reference tag based on the type; determining dimensions of the item in standardized units based on the known dimensions of the reference tag; and outputting information identifying the dimensions of the item.

In another example aspect, a computer program product includes a computer readable storage medium having program instructions embodied therewith. The program instructions are executable by a computing device to cause the computing device to perform operations including receiving an image of an item and a reference tag; identifying a perimeter of the item; identifying a type of the reference tag; identifying known dimensions of the reference tag based on the type; determining dimensions of the item in standardized units based on the known dimensions of the reference tag; and outputting information identifying the dimensions of the item.

In another example aspect, a system includes a processor, a computer readable memory, a non-transitory computer readable storage medium associated with a computing device, and program instructions executable by the computing device. The program instructions cause the computing device to perform operations including: receiving an image of an item and a reference tag; identifying a perimeter of the item; identifying a type of the reference tag; identifying known dimensions of the reference tag based on the type; determining dimensions of the item in standardized units based on the known dimensions of the reference tag; and outputting information identifying the dimensions of the item.

DETAILED DESCRIPTION

Figure 1:
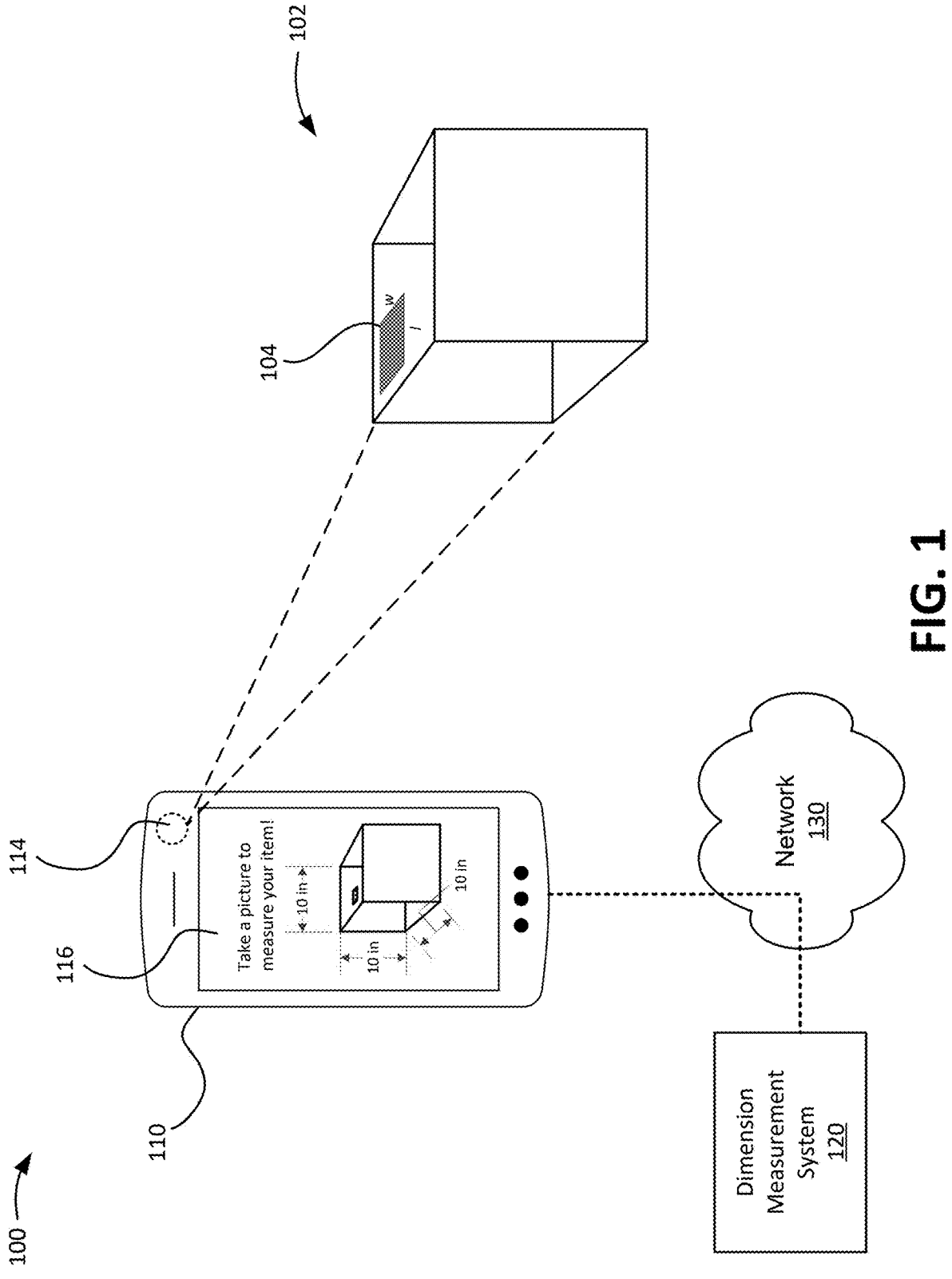
FIG. 1 illustrates an overview of an example implementation and environment in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Accurately measuring an item, such as a mail piece, a package, etc., may be cumbersome and inaccurate, thus leading to overcharging or undercharging a customer for service relating to the item (e.g., mail package delivery, luggage delivery, etc.). Accordingly, aspects of the present disclosure may facilitate and/or automate the measuring of an item such that item measurement is accurate, simple, and efficient. In one example embodiment, aspects of the present disclosure may include a system and/or method whereby an image of the item (e.g., a mail package) may be captured at any angle (e.g., an isometric angle showing all three dimensions of the item). As described herein, the system and/or method may automatically determine the dimensions of the item based on a ratio between the item's perimeter dimensions, and the known dimensions of a reference tag that is attached to the item. As one illustrative example, if the length and width of the object is three times the length and width of the reference tag, the length and width dimensions of the item may be determined to be three times that of the reference tag. The depth or third dimension may be determined based on the angle of the item in the captured image, and based on the ratio with the reference tag.

In some embodiments, the dimensions of the reference tag may be translated into a number of pixels in the captured image, and the length per pixel may be determined. The number of pixels for each dimension on the perimeter of the item may be determined, and then multiplied by the length per pixel amount. As an illustrative example, the reference tag may appear on the captured image as 100 pixels by 200 pixels. If the reference tag is known to be 1 inch by 2 inches, then each pixel is identified as $\frac{1}{100}^{th}$ of an inch. The perimeter of the item to be measured may be identified and the number of pixels defining the perimeter may be used to determine the item's dimensions. That is, the dimensions of the item may be defined in pixels, and the pixels may be converted to units of length (e.g., inches, centimeters, etc.). Continuing with the above example, if the item's dimensions are 300 pixels by 500 pixels by 600 pixels, the item's dimensions are determined to be 3 inches by 5 inches by 6 inches.

In some embodiments, the reference tag may be two dimensional or three dimensional. As one example, the reference tag may include a two-dimensional label, such as a shipping label in which the shipping label's dimensions are known. Additionally, or alternatively, the reference tag may be a standalone label having known dimensions. As described herein, features of the reference tag may be analyzed to determine the reference tag's identity, which indicates the reference tag's dimensions. For example, one type of shipping label may have different dimensions than another type of shipping label. Accordingly, the type of shipping label may be determined based on the features of the shipping label. The shipping label's dimensions may be determined based on the type, and the shipping label may be used as a reference tag whose known dimensions may be used to determine the dimensions of an item to which the shipping label is affixed.

In one example embodiment, the dimension measurement system, described herein, may be implemented in a mobile device (e.g., smart phone tablet, etc.) in which a user may capture an image of an item to be measured using an application. The dimension measurement system may identify the reference tag in the image, the known dimensions of the reference tag, and use the ratio between the known dimensions of the reference tag and the perimeter of the item in the image to measure the item's dimensions. In some embodiments, the dimension measurement system may be implemented in an automated system (e.g., automated mail sorting system, luggage sorting system, etc.). In this embodiment, a camera may automatically capture an image of an item in the automated system, and the item's dimensions are determined and used to support the operations of the automated system.

As described herein, a label may be one example of a reference tag. In some embodiments, other example objects having known dimensions may be used as a reference tag, or reference object (e.g., coins, postage stamps, paper currency notes, etc.). Also, more than one reference tags or objects may be used to improve measuring accuracy.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 illustrates an overview of an example implementation and environment in accordance with aspects of the present disclosure. As shown in FIG. 1, the environment 100 may include a user device 110, a dimension measurement system 120, and a network 130. In general, the user device 110 may host an application that may measure the dimensions of an item (e.g., item 102) having a reference tag.

The user device 110 may include a computing device capable of communicating via a network, such as the network 130. In example embodiments, the user device 110 may correspond to a mobile communication device (e.g., a smart phone or a personal digital assistant (PDA)), a portable computer device (e.g., a laptop or a tablet computer), etc. In some embodiments, the user device 110 may host an application to measure the dimensions of an item (e.g., item 102) by capturing an image of the item (e.g., at an isometric angle) using a camera device 114. As described herein, the user device 110 may communicate with a dimension measurement system 120 for determining the dimension of the item 102.

The dimension measurement system 120 may include one or more computing devices that supports and/or executes the operations of an item measuring application. In some embodiments, the dimension measurement system 120 may include an application server or other type of computing device that communicates with the user device 110 for measuring an item (e.g., item 102) based on the item's image and a reference tag affixed to the item (e.g., reference tag 104).

The network 130 may include one or more wired and/or wireless networks. For example, the network 130 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 130 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 130 may include copper transmission cables, optical transmission fibers, wireless transmission, routers, firewalls, switches, gateway computers and/or edge servers.

As shown in FIG. 1, the user device 110 may host an application (e.g., shown in a user interface 116) to measure a delivery item 102 to which a reference tag 104 is affixed. As an example, the reference tag 104 may be a shipping label. In some embodiments, a user may capture an image of the delivery item 102 via a camera device 114 of the user device 110. In some embodiments, the user device 110 may provide the image to the dimension measurement system 120. The dimension measurement system 120 may identify the perimeter of the item (e.g., using object detection, pixel-based classification techniques, and/or any other suitable technique to recognize the item). Further, the dimension measurement system 120 may detect the reference tag 104, extract features of the reference tag 104 to identify the reference tag type based on the features, identify the known dimensions of the reference tag 104 based on the type, and determine the length of each pixel in the captured image based on the known dimensions of the reference tag 104.

The dimension measurement system 120 may further determine the dimensions of the reference tag 104 in pixels (e.g., 100 pixels by 100 pixels by 100 pixels), and convert the dimensions in pixels to dimension in units of length (e.g., inches, centimeters, or the like). As an illustrative example, assume that the reference tag 104 is 300 pixels by 500 pixels (e.g., l=300 pixels and w=500 pixels) and that the known dimensions of the reference tag 104 is 3 inches by 5 inches. Thus, each pixel represents $\frac{1}{100}^{th}$ of an inch. Further, assume that the dimensions of the item are determined to be 1000 pixels by 1000 pixels by 1000 pixels. Thus, the dimension measurement system 120 may determine that dimensions of the delivery item 102 as 10 inches by 10 inches by 10 inches, and display these measurements within the interface 116 of the user device 110. Additionally, or alternatively, information regarding the item dimensions may be provided to any other source location (e.g., to a service provider that may create an order or a charge based on the item dimensions, a sorting system that may adjust sorting instructions based on the item dimensions, etc.).

In some embodiments, the dimension measurement system 120 may automatically detect edges or boundaries at an isometric angle within an image and calculate angles based on the reference tag 104. Based on these measurements, the unseen/not visible points of the item 102 may be inferred and the dimensions within the image pixel space may be determined. The dimension measurement system 120 may adjust the scale of the measured edges of the item 102 based on the pixel measurements of the reference tag 104 as compared to the known actual size of the reference tag 104.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. In some embodiments, devices of the environment 100 may interconnect via wired connections, wireless connections, or a combination of wired and wireless connections. Also, in some implementations, one or more of the devices of the environment 100 may perform one or more functions described as being performed by another one or more of the devices of the environment 100. More specifically, the operations performed by the dimension measurement system 120 may be performed locally by the user device 110. That is, the user device 110 may locally host and implement a dimension measurement system 120 without needing to communicate with the dimension measurement system 120 over the network 130.

Figure 2:
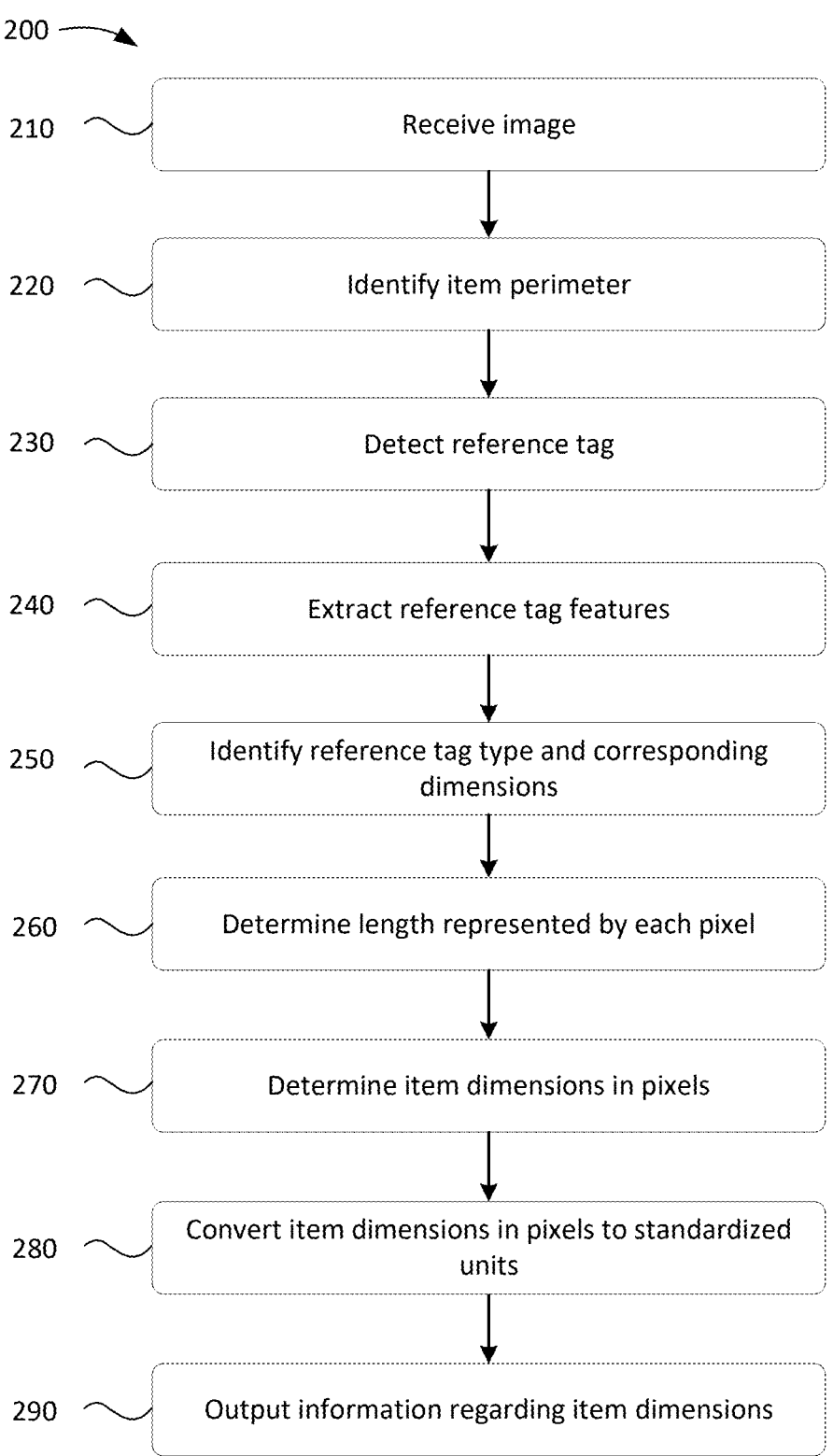
FIG. 2 illustrates an example flowchart of a process for measuring an item using an image of the item and a reference tag affixed to the item.

FIG. 2 illustrates an example flowchart of a process for measuring an item using an image of the item and a reference tag affixed to the item. The blocks of FIG. 2 may be implemented in the environment of FIG. 1, for example, and are described using reference numbers of elements depicted in FIG. 1. The flowchart illustrates the architecture, functionality, and operation of possible implementations of systems, methods, and computer program products according to various embodiments of the present disclosure.

As shown in FIG. 2, process 200 may include receiving an image (block 210). For example, the dimension measurement system 120 may receive an image from a camera device (e.g., implemented a user device 110 hosting an item measuring application, an automated system, etc.). In some embodiments, the measuring application may direct the user to capture an image of the item such that all dimensions and the reference tag is visible.

Process 200 also may include identifying the item perimeter (block 220). For example, the dimension measurement system 120 may identify the perimeter of the item (e.g., item 102) using any variety of image processing techniques, such as object detection analysis, contrast analysis, pixel-based classification, etc. In some embodiments, the dimension measurement system 120 may output a request or message to be displayed on the user device 110 directing the user to place the item 102 in front of a higher contrast background and retake the image (e.g., to allow the dimension measurement system 120 to more easily and accurately identify the perimeter of the item 102).

Process 200 further may include detecting the reference tag (block 230). For example, the dimension measurement system 120 may detect the reference tag (e.g., the reference tag 104) affixed to the item 102. Alternatively, the reference tag 104 may not necessarily need to be fixed to the item 102, but placed next to or on the item 102.

Process 200 also may include extracting reference tag features (block 240). For example, the dimension measurement system 120 may extract features of the reference tag 104 in order to identify the type of reference tag 104. Example features that may be extracted may include a barcode, text, indicia, logo, etc. In some embodiments, the features of the reference tag 104 may identify a format of the reference tag 104, which may indicate the type of the reference tag 104. As one illustrative example, the presence of a barcode and an address may indicate that the reference tag 104 is of a shipping label. More specifically, the location, size, and formatting of the features on the reference tag 104 may indicate the type of shipping label, a shipping label template type, and/or other identifying information regarding the shipping label that indicates its dimensions. In some embodiments, the reference tag 104 may include a barcode, a Quick Response (QR) code, and/or other information that the dimension measurement system 120 may use to look up the type of the reference tag 104.

Process 200 further may include identifying the reference tag type and corresponding dimensions (block 250). For example, the dimension measurement system 120 may identify the reference tag type based on the features (e.g., extracted at block 240). In some embodiments, the dimension measurement system 120 may use a lookup table/data structure to identify the type of reference tag 104 corresponding to the extracted features. That is, the data structure may store information identifying the extracted features and the type of reference tag corresponding to those features. Further, the dimension measurement system 120 may identify (e.g., from the data structure), the known dimensions of the reference tag 104 based on the identified type.

Process 200 also may include determining a length represented by each pixel (block 260). For example, the dimension measurement system 120 may determine a length represented by each pixel in the captured image (e.g., received at block 210). In some embodiments, the length represented by each pixel may include dividing the known length of the reference tag 104 by the number of pixels that the length of the reference tag 104 occupies in the image. As an illustrative example, if the reference tag 104 in the image is 300 pixels in length, and the known length is 3 inches, the dimension measurement system 120 may determine that each pixel represents a length of $\frac{1}{100}^{th}$ of an inch. In some embodiments, the dimension measurement system 120 may determine the number of pixels in the length of the reference tag 104 using a pixel counter or other similar type of function.

Process 200 further may include determining the item dimensions in pixels (block 270). For example, the dimension measurement system 120 may determine the item dimension in pixels based on the item perimeter (e.g., as determined at block 220). In some embodiments, the dimension measurement system 120 may use a pixel counter or similar function to count the number of pixels of each dimension of the item 102 in the image.

Process 200 also may include converting the item dimensions in pixels to standardized (block 280). For example, the dimension measurement system 120 may convert the item dimensions in pixels (e.g., determined at block 270) into standardized units of length (e.g., inches, centimeters, etc.). In some embodiments, the dimension measurement system 120 may convert the dimensions by multiplying the length represented by each pixel (e.g., obtained at block 260) to the item dimensions (e.g., obtained at block 280). That is to say, the dimension measurement system 120 may determine the dimensions of the item 102 based on a ratio between the known dimensions of the reference tag 104, and the dimensions of the item 102. For example, if the length of the item 102 is three times the length of the reference tag 104, the dimension measurement system 120 may multiply the known length of the reference tag 104 to obtain the length of item 102. The dimension measurement system 120 may obtain the other dimensions of the item (e.g., width and depth) in a similar manner. Other examples of converting the item dimensions to standardized units is described above with respect to FIG. 1.

Process 200 further may include outputting information regarding the item dimensions (block 290). For example, the dimension measurement system 120 may output information regarding the item dimensions (e.g., after converting to standardized units as at block 280). In some embodiments, the dimension measurement system 120 may output the information for display (e.g., on user device 110). Additionally, or alternatively, the dimension measurement system 120 may output the information regarding the item dimensions to another source or destination (e.g., a system associated with a service provider, an automated system, etc.).

As described herein, a user may more easily, more quickly, and more accurately measure the dimensions of an item simply by taking a photograph of the item with a reference tag 104 affixed to or within the same photograph of the item to be measured. In this way, item measuring speed and accuracy is improved.

Figure 3:
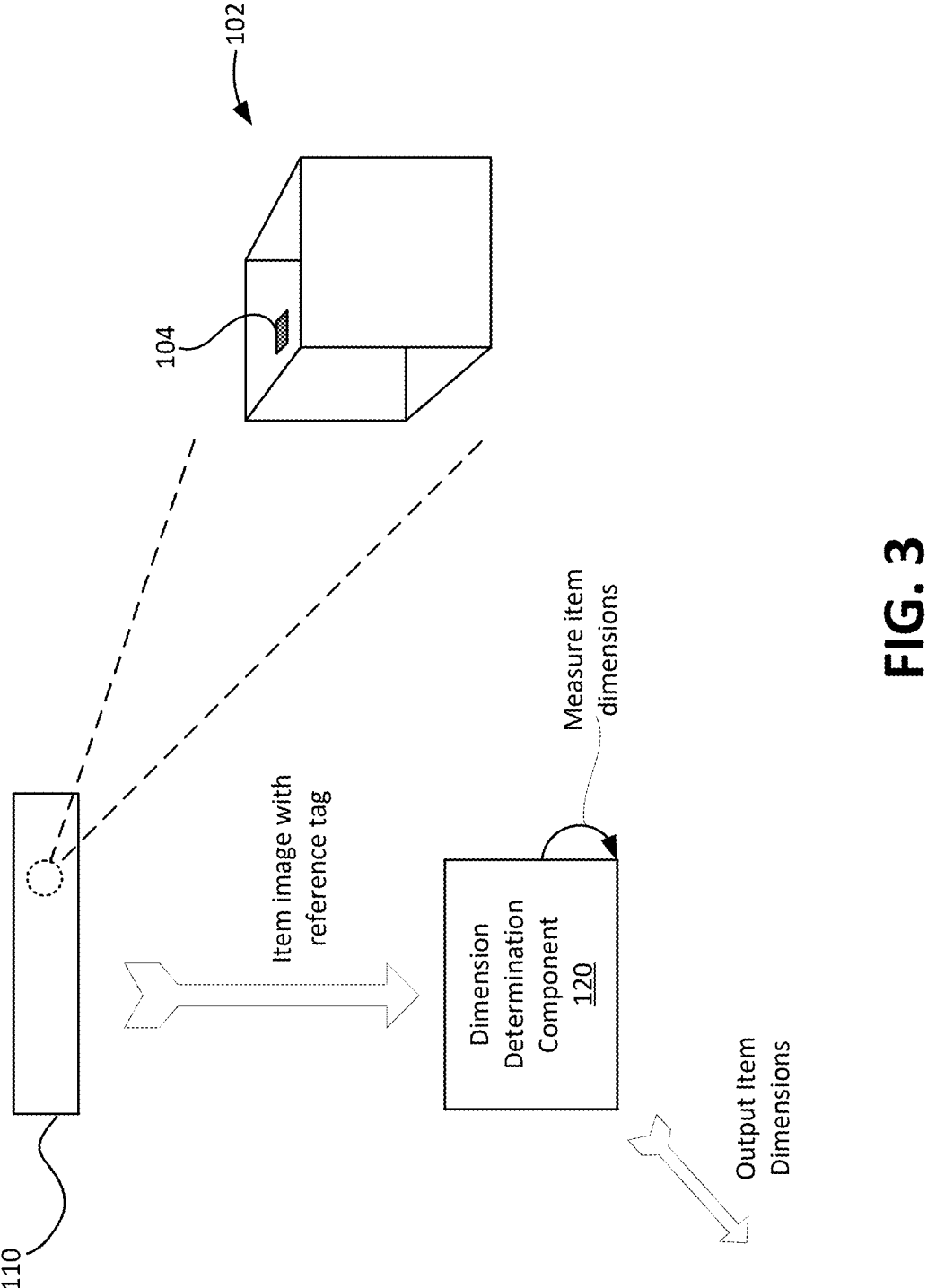
FIG. 3 illustrates an example implementation of automating the measuring of an item based on an image of the item and a reference tag.

FIG. 3 illustrates an example implementation of automating the measuring of an item based on an image of the item and a reference tag. In the example of FIG. 3, the user device 110 may be implemented in automated system (e.g., mounted in a sorting system, above a conveyor belt, etc.). The user device 110 in this example may be any type of computing device with a camera to capture an image and in communication with a dimension measurement system 120. As shown in FIG. 1, the user device 110 may capture an image of the item 102 having a reference tag 104, and provide the image to the dimension measurement system 120. The dimension measurement system 120 may measure the item dimensions (e.g., in accordance with process 200 of FIG. 2), and output the item dimensions. For example, the dimension measurement system 120 may output the item dimensions to an automated system, an external system, a service provider, etc., that may use the item dimensions in connection with performing a task or providing a service based on the item dimensions. In this way, the determination of item dimensions may be expedited to improve the operations of automated systems that use item dimensions.

Figure 4:
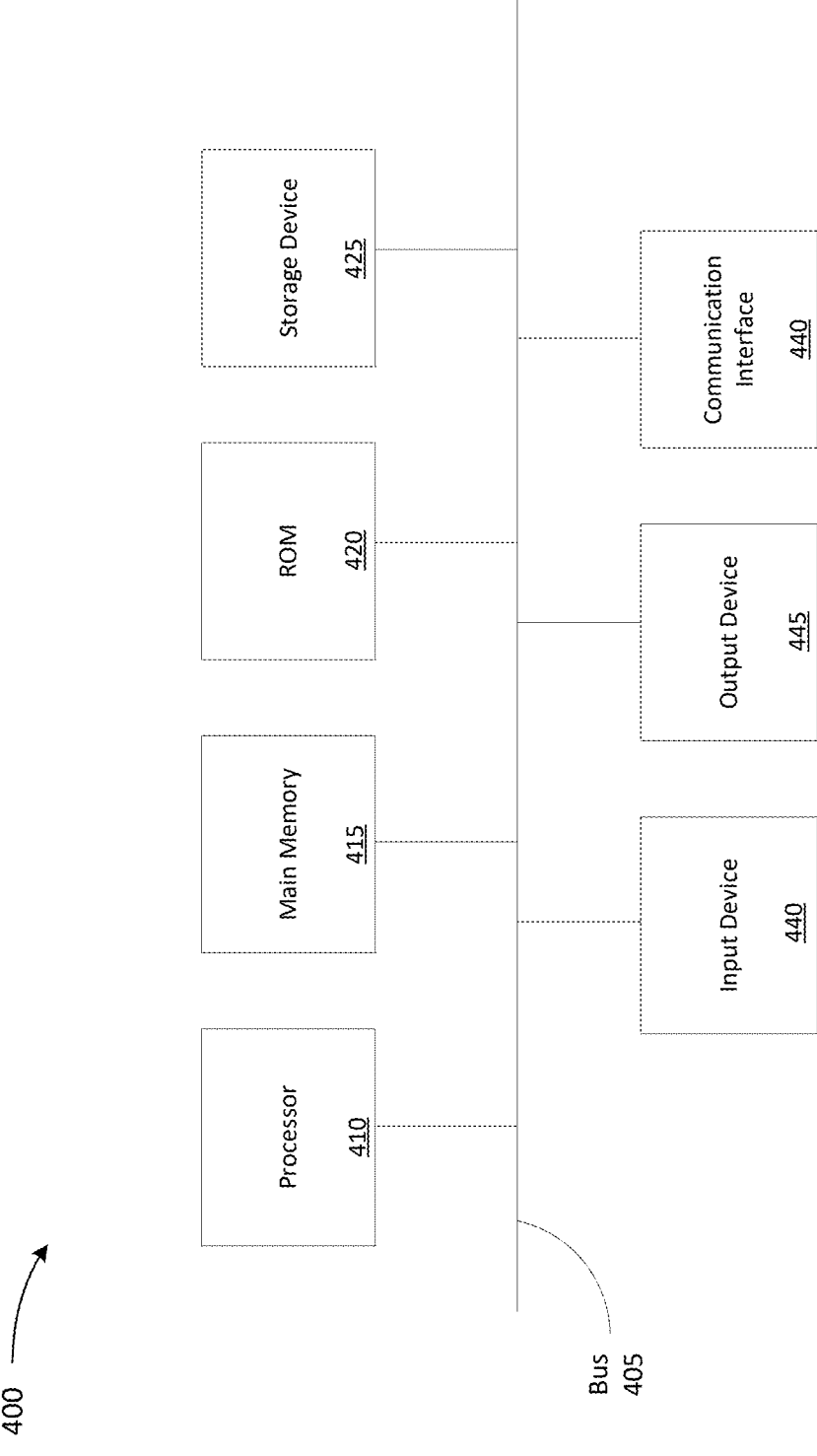
FIG. 4 illustrates example components of a device that may be used within environment 100 of FIG. 1.

FIG. 4 illustrates example components of a device 400 that may be used within environment 100 of FIG. 1. Device 400 may correspond to the user device 110 and/or the dimension measurement system 120. Each of the user device 110 and/or dimension measurement system 120 may include one or more devices 400 and/or one or more components of device 400.

As shown in FIG. 4, device 400 may include a bus 405, a processor 410, a main memory 415, a read only memory (ROM) 420, a storage device 425, an input device 440, an output device 445, and a communication interface 440.

Bus 405 may include a path that permits communication among the components of device 400. Processor 410 may include a processor, a microprocessor, an application specific integrated circuit (ASIC), a field programmable gate array (FPGA), or another type of processor that interprets and executes instructions. Main memory 415 may include a random-access memory (RAM) or another type of dynamic storage device that stores information or instructions for execution by processor 410. ROM 420 may include a ROM device or another type of static storage device that stores static information or instructions for use by processor 410. Storage device 425 may include a magnetic storage medium, such as a hard disk drive, or a removable memory, such as a flash memory.

Input device 440 may include a component that permits an operator to input information to device 400, such as a control button, a keyboard, a keypad, or another type of input device. Output device 445 may include a component that outputs information to the operator, such as a light emitting diode (LED), a display, or another type of output device. Communication interface 440 may include any transceiver-like component that enables device 400 to communicate with other devices or networks. In some implementations, communication interface 440 may include a wireless interface, a wired interface, or a combination of a wireless interface and a wired interface. In embodiments, communication interface 440 may receive computer readable program instructions from a network and may forward the computer readable program instructions for storage in a computer readable storage medium (e.g., storage device 425).

Device 400 may perform certain operations, as described in detail below. Device 400 may perform these operations in response to processor 410 executing software instructions contained in a computer-readable medium, such as main memory 415. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 415 from another computer-readable medium, such as storage device 425, or from another device via communication interface 440. The software instructions contained in main memory 415 may direct processor 410 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 400 may include additional components, fewer components, different components, or differently arranged components than are shown in FIG. 4.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method performed by an item measuring system included in an automated mail sorting system, the computer-implemented method comprising:

receiving an image of an item including a reference tag attached to the item, the image of the item having been captured at an isometric angle showing three dimensions of the item;

attempting to automatically detect a perimeter of the item within the image using a contrast-analysis image processing technique;

in response to failing to detect the perimeter of the item within the image using the contrast-analysis image processing technique, outputting a message directing a user to place the item in front of a high contrast background to produce a retaken image of the item, wherein the retaken image has the high contrast background;

receiving the retaken image of the item having the high contrast background, including the reference tag attached to the item;

automatically detecting, using the contrast-analysis image processing technique, the perimeter of the item within the retaken image having the high contrast background;

identifying a type of the reference tag;

identifying known dimensions of the reference tag based on the type;

determining a number of pixels for each dimension associated with the perimeter of the item in the retaken image;

determining dimensions of the item based on corresponding numbers of pixels associated with the known dimensions of the reference tag and the number of pixels for each dimension associated with the perimeter of the item in the retaken image; and causing an adjustment to at least one of the mail sorting operations of the automated mail sorting system based on the dimensions of the item.

2. The method of claim 1, wherein the determining the dimensions of the item further comprises:

determining a length represented by each pixel in the retaken image based on the known dimensions of the reference tag and the numbers of pixels associated with each of the dimensions of the reference tag;

determining the dimensions of the item in a form of pixels in the retaken image; and converting the dimensions of the item in the form of pixels to standardized units based on the length represented by each pixel.

3. The method of claim 1, wherein the identifying the type of the reference tag comprises extracting features of the reference tag from the retaken image.

4. The method of claim 1, wherein the retaken image is received from a computing device hosting an application for measuring the item based on capturing the retaken image of the item.

5. The method of claim 1, wherein the identifying the known dimensions of the reference tag based on the type comprises:

accessing, based on the identified type, a length dimension of the reference tag from a data structure.

6. The computer-implemented method of claim 1, wherein:

the receiving of the image includes receiving the image from a computing device that captured the image.

7. The computer-implemented method of claim 6, wherein the computing device is operably connected to a camera.

8. A computer program product comprising a computer readable storage medium having program instructions embodied therewith, the program instructions executable by a computing device of an automated mail sorting system to cause the computing device to perform operations comprising:

receiving an image of an item including a reference tag attached to the item, the image of the item having been captured at an isometric angle showing three dimensions of the item;

attempting to automatically detect a perimeter of the item within the image using a contrast-analysis image processing technique;

in response to failing to detect the perimeter of the item within the image using the contrast-analysis image processing technique, outputting a message directing a user to place the item in front of a high contrast background to produce a retaken image of the item, wherein the retaken image has the high contrast background;

receiving the retaken image of the item having the high contrast background, including the reference tag attached to the item;

automatically detecting, using the contrast-analysis image processing technique, the perimeter of the item within the retaken image having the high contrast background;

identifying a type of the reference tag;

identifying known dimensions of the reference tag based on the type;

determining a number of pixels for each dimension associated with the perimeter of the item in the retaken image;

determining dimensions of the item based on corresponding numbers of pixels associated with the known dimensions of the reference tag and the number of pixels for each dimension associated with the perimeter of the item in the retaken image; and causing an adjustment to at least one of the mail sorting operations of the automated mail sorting system based on the dimensions of the item.

9. The computer program product of claim 8, wherein the determining the dimensions of the item further comprises:

determining a length represented by each pixel in the retaken image based on the known dimensions of the reference tag and the numbers of pixels associated with each of the dimensions of the reference tag;

determining the dimensions of the item in a form of pixels in the retaken image; and converting the dimensions of the item in the form of pixels to standardized units based on the length represented by each pixel.

10. The computer program product of claim 8, wherein the identifying the type of the reference tag comprises extracting features of the reference tag from the retaken image.

11. The computer program product of claim 8, wherein the retaken image is received from a computing device hosting an application for measuring the item based on capturing the retaken image of the item.

12. The computer program product of claim 8, wherein the identifying the known dimensions of the reference tag based on the type comprises:

accessing, based on the identified type, a length dimension of the reference tag from a data structure.

13. The computer program product of claim 8, wherein:

the receiving of the image includes receiving the image from a computerized device that captured the image.

14. A system comprising:

a processor, a computer readable memory, a non-transitory computer readable storage medium associated with a computing device of an automated mail sorting system, and program instructions executable by the computing device to cause the computing device to perform operations comprising:

receiving an image of an item including a reference tag attached to the item, the image of the item having been captured at an isometric angle showing three dimensions of the item;

attempting to automatically detect a perimeter of the item within the image using a contrast-analysis image processing technique;

in response to failing to detect the perimeter of the item within the image using the contrast-analysis image processing technique, outputting a message directing a user to place the item in front of a high contrast background to produce a retaken image of the item, wherein the retaken image has the high contrast background;

receiving the retaken image of the item having the high contrast background, including the reference tag attached to the item;

automatically detecting, using the contrast-analysis image processing technique, the perimeter of the item within the retaken image having the high contrast background;

identifying a type of the reference tag;

identifying known dimensions of the reference tag based on the type;

determining a number of pixels for each dimension associated with the perimeter of the item in the retaken image;

determining dimensions of the item based on corresponding numbers of pixels associated with the known dimensions of the reference tag and the number of pixels for each dimension associated with the perimeter of the item in the retaken image; and causing an adjustment to at least one of the mail sorting operations of the automated mail sorting system based on the dimensions of the item.

15. The system of claim 14, wherein the determining the dimensions of the item further comprises:

determining a length represented by each pixel in the retaken image based on the known dimensions of the reference tag and the associated corresponding numbers of pixels;

determining the dimensions of the item in a form of pixels in the retaken image; and converting the dimensions of the item in the form of pixels to standardized units based on the length represented by each pixel.

16. The system of claim 14, wherein the identifying the type of the reference tag comprises extracting features of the reference tag from the retaken image.

17. The system of claim 14, wherein the retaken image is received from a computing device hosting an application for measuring the item based on capturing the retaken image of the item.

18. The system of claim 14, wherein the identifying the known dimensions of the reference tag based on the type comprises:

accessing, based on the identified type, a length dimension of the reference tag from a data structure.

19. The system of claim 14, wherein the receiving of the image includes receiving the image from a computerized device that captured the image.

20. The system of claim 6, wherein the computerized device is operably connected to a camera.

* * * * *